Nov. 25, 1969 J. J. HANAK 3,479,738

MAGNETIC HEADS

Filed May 23, 1967

INVENTOR
JOSEPH JOHN HANAK

BY Edward J Norton
ATTORNEY

United States Patent Office 3,479,738
Patented Nov. 25, 1969

3,479,738

MAGNETIC HEADS

Joseph John Hanak, Trenton, N.J., assignor to RCA Corporation, a corporation of Delaware
Filed May 23, 1967, Ser. No. 641,443
Int. Cl. H01f 7/06; G11b 5/42
U.S. Cl. 29—603 6 Claims

ABSTRACT OF THE DISCLOSURE

There is disclosed a magnetic transducer and method of manufacturing the same for use in high frequency recording and reproducing apparatus. The transducer comprises at least two circuit parts of single crystal ferrite positioned to form a front gap, which is filled by a suitable technique with a non-magnetic spacing material. The back surfaces of the ferrite circuit parts are united by molecular transport which provides a relatively low reluctance path in the vicinity of the final assembled transducer which was formerly occupied by the back surfaces of the circuit parts or back gap. The molecular transport bond results in a ferrite molecular distribution which affords a reluctance of the same order of magnitude as the reluctance associated with a continuous body of ferrite, minimizing the drive current required for operation because of the virtual elimination of the back gap in the transducer.

BACKGROUND OF INVENTION

A recording head is basically a miniature horse shoe electro-magnet in which the pole piece separation is a function of the frequency of operation. For use in high frequency recording and reproducing apparatus, there is needed a transducer which has a very small pole piece separation gap width in the order of magnitude of 1 to 3 microns. Furthermore, because of the techniques employed in video recording there is a contacting of the transducer with the recording medium resulting in increased wear of the transducer and a low life expectancy. Many high frequency heads normally employ some type of ferrite because of the characteristics ferrites possess such as low reluctances, good magnetic properties and excellent high frequency response. In spite of these characteristics such heads are still susceptible to cracking and chipping especially in the vicinity of the pole piece separation or gap. Hence as is taught in the prior art, the gap is usually filled with a material of equal hardness to that of the ferrite such as glass or a suitable metallic substance. However, due to the small pole separation or gap length of high frequency transducers the construction of such heads becomes difficult in that the required tolerances cannot be easily obtained. Such transducers or heads have been made of two halves of ferrite held together by forcing the parts together either mechanically or by the application of a poting resin or some other suitable type of glues. The gap material is made from a non-magnetic material and also held in place by a compression technique or glue. From the above it is clear that in these particular transducers the gap material is usually not bonded to the ferrite parts and because of this such heads have very low life expectancy when operated in high speed devices.

Presently a great many recording heads are made of metal such as mu-metal which is rather soft and wears easily, or of an aluminum-silicon-iron alloy known as Sendust or Alfacon which is hard and brittle. Recently ferrite heads have been employed as transducers and as such are capable of longer life and better frequency response than the above types. But, as indicated, these transducers still suffer from erosion and loss as small grains of the ferrite are shaken loose by the high speed moving tape or head assemblies used in modern transports. The prior art indicates some significant developments in ferrite head technology among which is the joining of the two ferrite circuit parts by flowing low melting point glass into the gap areas. In this manner the glass acts as both the bond and gap spacing material. However, in spite of the advancement in the technology such heads still exhibit relatively poor life characteristic because of the tendency of the glass gap to wear at a faster rate than the ferrite. Another problem is that glass is also utilized in an area designated by the prior art as the back gap. Glass or any other non-magnetic material in the back gap serves to increase the drive requirements for such heads and hence makes high frequency operation of such devices more difficult.

It is therefore an object of the present invention to provide an improved ferrite transducer capable of high frequency operation and long life expectancy.

A further object is to provide an improved ferrite transducer in which a low reluctance path is provided throughout the body of the device, not including the front gap, whereby any back gap effect is virtually eliminated.

Still a further object is to provide a method for manufacturing an improved magnetic transducer where the reluctance due to the back gap is substantially eliminated.

According to one aspect of the invention, a transducer is provided which comprises at least two C-shaped circuit parts of single crystal ferrite. The circuit parts are positioned in a manner to form a front gap between two of their surfaces. The front gap is completely filled in with alumina which is bonded to the respective front gap forming surfaces. The head also is united at its back surfaces by a molecular transport of the ferrite grains from one circuit part to another. The bond formed by molecular transport provides a reluctance path in its vicinity which offer a reluctance equivalent to that of a continuous ferrite.

Also according to the invention a method of manufacturing such transducers is described in which at least the back surfaces of the circuit parts are joined together by molecular transport due to a glass film sputtered on the surfaces. The two treated back surfaces are now subjected to applied pressure and temperature preferably in the presence of a vacuum, which conditions cause the sputtered glass to flow in a manner causing it to behave as a flux. In this mode, the glass serves to transport ferrite molecules which form a chemical or a molecular transport bond between these back surfaces thereby uniting them in a low reluctance mode. In a second method according to the invention at least the front surface of the ferrite circuit parts are etched to a depth of one half the thickness of the final gap. The etched front surfaces are then coated by radio frequency sputtering of a thin film of glass thereof. A thin film of alumina is then sputtered onto one of the circuit parts. This film of alumina is again coated with another thin film of glass. The back gap area is also covered with a layer of glass whose depth is closely controlled to enable the glass to behave as a transport flux. The treated circuit parts are then placed in a vacuum at a given temperature and by the use of pressure for a suitable time are united together and then cooled. The final assembly is a high frequency transducer with an alumina gap spacer in which there is virtually no reluctance contribution attributed to a back gap and in which the gap definition due to the alumina is unimpaired.

Figure 1:
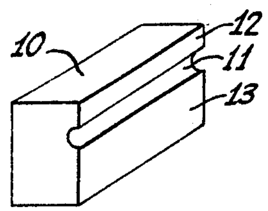
FIGURE 1 is a perspective view of a single crystal ferrite circuit part used in this invention.

If reference is made to FIGURE 1, there is shown a ferrite crystal 10 which is preferably constructed from a single crystal ferrite material such as manganese ferrites. The requirement placed on the ferrite bar 10 is that it have high saturation magnetization and low coercive force. Ferrites suitable for such applications are manganese zinc ferrite, manganese ferrite, nickel zinc ferrite, and so on. Consequently a single crystal of suitable material is cut into a plurality of bars as 10 each of which is typically one half to one inch long. A groove 11, which is a semicircular shape, is cut into one surface of the ferrite bar 10. Numeral 12 represents the front face or front end of the bar 10. The face 12 is to be that face at which the front gap of the final transducer is located. Numeral 13 presents the back face or back end of the ferrite crystal 10. The faces 12 and 13 of the ferrite bar 10 are polished to a fine finish and in the same plane. Then, the polished surface 12 which is above the groove 11 is etched to a depth equal to one half the thickness of the desired gap. A radio frequency sputter etching of the face 12 is accomplished by placing the ferrite bar 10 on the surface of the cathode in the sputtering apparatus. Surfaces 13 and 11 not to be etched are properly masked before etching the surface 12. The anode of the sputtering apparatus is exposed and the bar 10 is properly positioned to permit etching the process to proceed for a length of time necessary to achieve one half the desired gap thickness.

Figure 2:
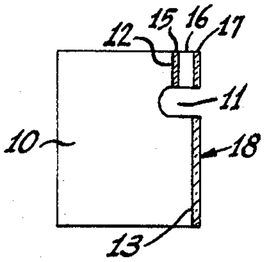
FIGURE 2 is a cross sectional view of the bar of FIGURE 1 prior to bonding.

If reference is made to FIGURE 2, there is shown a front cross sectional view of the bar 10. The etched front surface 12 is next coated with a film of glass 15. The glass 15 is applied by means of an R.F. sputtering technique to a thickness of about 300 to 1200 angstrom units. The glass used for sputtering on to the surface 12 may be Pyrex. The important point is that by the use of radio frequency sputtering techniques a suitable layer of glass is deposited on the surface 12 within very close tolerances. The use of this technique enables one to use practically any type of glass available for layer 15 which does not have to have the same or a similar coefficient of expansion as the ferrite bar 10. This is so because using thin films of glass in this method creates forces which are generated by thermal expansion differences which are too minute in magnitude to cause fracture of the resulting bonds. After the layer 15 has been placed on the surface 12 of the ferrite 10, a thin film 16 of $Al_2O_3$ or alumina is sputtered on top of glass layer 15. The thickness of the alumina film 16 is sputtered to a depth approximately equal to one half the thickness of the intended front gap minus the dimension allocated to the glass film 15 which is in the range of 300 to 1200 angstrom units. A preferred thickness suitable for the glass layer 15 has been found to be about 500 angstrom units. After the alumina layer 16 is sputtered on to the glass layer 15, another bonding glass film layer 17 is sputtered on the opposite face of the alumina layer 16. A layer of glass 18 is also sputtered or coated to a thickness of about 500 angstrom units, on the polished back end or back surface 13 of the ferrite bar 10.

A pair of bars 10, treated as shown in FIGURE 2, are then placed with the treated surfaces facing each other. The two bars 10 are placed in a vacuum at a temperature of at least 900 degrees centigrade. If reference is made to FIG. 3, there is shown the resulting assembly fabricated from the bars 10. The temperature selected, namely, about 900 degrees centigrade, and a pressure of at least 2,000 pounds per square inch are applied to the mirror image treated pieces 10 to permit the thin glass films 15 on surfaces 12 and 13 to diffuse into the ferrite. The motion of the glass molecules in contact with the ferrite bar 10 causes the glass to act as a flux capable of dissolving and transporting the molecules of ferrite which results in an actual motion or movement of ferrite molecules from one side of the boundary formed by the two surfaces 13 into the other side of the boundary. To be more explicit, there is a migration of ferrite molecules from one ferrite piece 10 to the other ferrite piece. While this transport of ferrite molecules is taking place, glass molecules are diffusing into the solid bars 10. This diffusion of glass molecules soon depletes all of the glass phase present in films 18 between the two adjacent ferrite bars. Thus with the pressure still applied the two ferrite pieces are not only brought intimately in contact but also grow together into one ferrite body.

Figure 3:
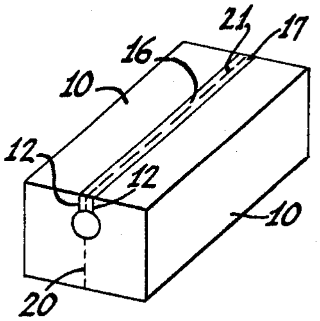
FIGURE 3 is a perspective view of a complete ferrite bar before slicing into individual heads.
Figure 4:
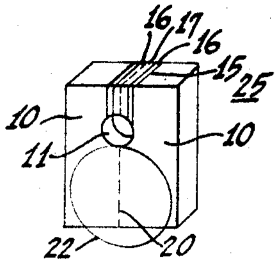
FIGURE 4 is a perspective view of a magnetic transducer according to this invention.

After the specimen as shown in FIGURE 3 has been cooled, the transported ferrite molecules assume a configuration which by its very nature is a molecular transport bond. This bond is indicated by dotted line 20 shown in FIGURE 3. The characteristics of such a bond is that the reluctance due to this bond behaves as if the entire assembly of FIGURE 3 did not possess a back gap and as such the bond 20 behaves as if it were continuous ferrite. In the manner described above, the resulting assembly of FIGURE 3 only has an appreciable high reluctance path primarily due to the front gap 21, comprising the non-magnetic alumina 16. By the application of control temperature and pressure during the bonding process and further by the controlled thickness of the film 18, the conditions specified cause the molecular transport phenomenon to bond the two back faces 13 in the manner described. The front gap 21 shown in FIGURE 3 comprises a layer of alumina 16, a thin layer of glass 17 which is then bonded to another layer of alumina 16 which is secured by means of a glass bond to the face 12 of the ferrite bar 10. The assembly as shown in FIGURE 3 is then cut at desired intervals into individual head assemblies 25 as shown in FIGURE 4. Before the assembly of FIGURE 3 is cut, the top surface which contains the front gap may be polished and ground to a suitable finish. The transducer or head 25 shown in FIGURE 4 indicates the construction of the gap when the head is fabricated by the techniques outlined above. The head 25 is made of the two pieces of ferrite 10 each treated as that of FIG. 2 but being mirror images of each other. The respective areas of alumina 16 associated with the right and left ferrite bars 10 are bonded together by the glass film 17. It is noted that there is relatively no transport of glass molecules into the alumina 16 and the gap bond 17 is glass-to-alumina; an important factor being, that there is no noticeable transport of glass molecules or alumina molecules in these bonds. The glass used in bond 17 does not, however, have to have the same coefficient of expansion as the alumina 16 because the predominant bonding factor is the original thickness of glass deposited on the layer 16 of alumina, which glass is deposited to a depth of 500 angstrom units. The aperture 11 is shown and is formed by the two mirror image semi-circular apertures 11 of FIGURE 2. The aperture 11 is of a dimension necessary to accommodate suitable coil windings to allow proper functioning of the transducer 25. Techniques for winding and fabricating such coils are known in the art and are not considered part of this invention. The molecular transport bond is indicated as dashed line 20 and is shown in FIGURE 4 surrounded by a circle 22.

Figure 5:
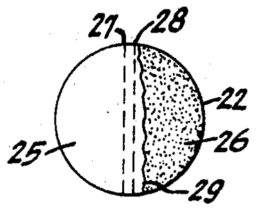
FIGURE 5 is an enlarged view of a transport molecular ferrite bond as employed in the transducer of FIG. 4.

FIGURE 5 shows the molecular transport bond's configuration within the area 22 of FIG. 4 as it is viewed with the aid of a microscope at a magnification of 100 to 1000 times. Numeral 25 represents a portion of ferrite within the left positioned ferrite piece 10 of FIGURE 4. Numeral 26 is a portion of ferrite present in the right handed ferrite piece 10 of FIGURE 4 and it is stipulated for clarification. There is shown two dotted lines 27 and 28 which represent the mechanical boundary formed by the two separate edges of the ferrite pieces 10 when they are forced against each other prior to the bonding procedure. During the bonding process the glass present between the two ferrites softens and dissolves some of the ferrite. The glass behaving as a tranport flux becomes saturated with ferrite molecules whereupon the ferrite molecules are transported across the boundary attaching themselves onto non-dissolved ferrite molecules. Because of such factors as temperature differences or crystallographic orientations one face 13 of FIG. 1 starts to grow at the expense of the other. At the same time the glass diffuses into the solid body of both sides of the non-dissolved ferrite pieces 10. The thickness of glass film chosen enables the diffusion to be accomplished rapidly and when accomplished the mechanical separation evidenced by lines 27 and 28 disappears and the ferrite molecules 26 of the right hand piece, for example, are transported molecularly into the left hand positioned ferrite pieces 10 and this causes a grain boundary and a molecular bond to be formed. The irregular line 29 represents the formation of a new grain boundary. Two single crystal ferrite bars 10, aligned at the mechanical separation, are replaced by one continuous crystal structure. The transport of ferrite molecules between portions 26 and 25 causes the bond formed to unite the pieces together so that the bond behaves as a continuous piece of ferrite and hence possesses a reluctance which is equivalent to the reluctance of that of each individual piece 10 used in fabricating the final head 25 of FIGURE 4. Under the microscope the bond shown in FIG. 5 contains no glass phase because of the diffusion thereof into the ferrite pieces.

Figure 6:
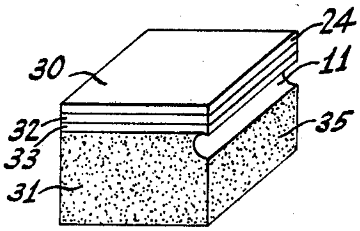
FIGURE 6 is a perspective view of a single crystal ferrite bonded to a poly crystal ferrite according to this invention.

FIGURE 6 shows a polished single crystal platelet 30 on top of a polished polycrystalline bar 31. The single crystal ferrite platelet 30 is fabricated from manganese ferrite grown into single crystals by a chemical vapor deposition technique. The platelets 30 formed by deposition are then polished to a high luster and cut to a desired dimension. A thin film of glass 32 of about 500 angstrom units is then deposited on one surface of the platelet 30 by means of a radio frequency sputtering technique as described above. The platelets of manganese ferrite exhibit high crystalline perfection and possess saturation magnetizations on order of magnitude of about 4000 gauss. However, due to the deposition technique the platelets are thin and can only be used as a top portion or pole tips of a head or transducer. The bar of polycrystalline ferrite 31 is grooved to have a semicircular aperture 11. The bar 31 is then polished, and a layer of glass 33 is radio-frequency sputtered on its surface. The two bars 30 and 31 are brought into contact under pressure in a vacuum of about $10^{-3}$ torr and at a temperature of about 900 degrees centigrade. The applied conditions of temperature and pressure together with the 500 angstrom unit thick glass causes a molecular transport bond to form between the polycrystalline ferrite bar 31 and the single crystal bar 30. This bonding or uniting of the two, results in a reluctance path in the area of juncture equal to that of a single continuous ferrite. The reluctance is approximately equivalent to that of the polycrystalline ferrite. The resulting composite ferrite slab is now processed as described above. That is the front face 34 and back face 35 are polished, a layer of glass is sputtered thereon to a thickness of 300 to 1200 angstrom units, and then the layer of alumina is sputtered on. The units thus treated appear as in FIGURE 2 with the exception of the extra polycrystalline body which serves as a support for the hard crystal ferrites and also serves to enable easy core accommodation.

Figure 7:
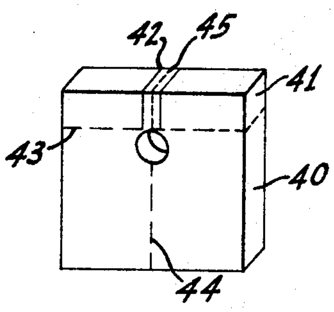
FIGURE 7 is a perspective view of another magnetic transducer according to this invention.

The resulting head obtained from this technique is shown in FIGURE 7. It has a body of polycrystalline ferrite 40 united with a single crystalline ferrite top body 41 which is bonded to the polycrystalline body 40 by a molecular transport bond 43 as shown in FIGURE 5. The major portion of the gap is filled with the alumina 42 bonded to the respective ferrite pieces by glass bonding. The dashed line 45 in the center of the alumina 42 represents the glass bonding layer between the alumina layers. Dashed line 44 represents the area of the molecular transport bond by which the back gap normally formed in this area is virtually eliminated.

Figure 8:
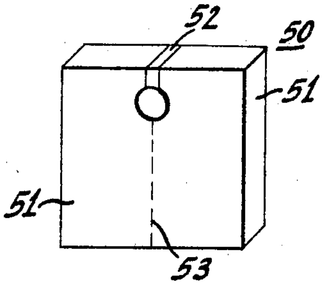
FIGURE 8 is a perspective view of still another magnetic transducer.

FIGURE 8 shows a further embodiment of a magnetic transducer 50 fabricated from two mirror-image bars of single crystal ferrite 51. In the fabrication of the head 50, one front surface of one ferrite piece 51 as indicated by surface 12 of FIGURE 1 is treated in the manner described above and upon completion appears as the unit shown in FIGURE 2 with the exception that the alumina deposited is equal to the gap length instead of one half the length. The other piece has a layer of glass deposited on its corresponding surface 12 and back surface 13. The two pieces are joined together in the manner described above so that the resultant head 50 has a gap 52 with only alumina in the center thereof, the glass layer 17 of the head 25 of FIG. 4 having been eliminated. The backing unit, molecular transport bond is suggested by the dashed line 53.

What is claimed is:

1. In a method for manufacturing magnetic transducers comprising at least two circuit parts of ferrite having a relatively low reluctance, said transducers having a front gap therebetween filled with a non-magnetic gap spacing material, the improvement comprising the steps of, (a) polishing the back surfaces of said circuit parts,
(b) sputtering said polished back surfaces with a thin layer of glass,
(c) placing said back surfaces in a vacuum with said surfaces facing and in contact with each other,
(d) exerting pressure to said ferrite circuit parts and at said sputtered back surfaces in said vacuum at a temperature sufficient and for a time sufficient to cause the flow of said glass into said ferrite parts while simultaneously uniting said parts by ferrite molecular transport to form a bond that has approximately the same reluctance as said circuit parts, and
(e) cooling the resulting bonded assembly.

2. The method according to claim 1 in which said polished back surfaces are sputtered by radio frequency energy with a thin layer of glass between 300 and 1200 angstrom units.

3. A method of manufacturing magnetic transducers consisting of at least two circuit parts of ferrite with a front gap therebetween filled with alumina, and united at their back surfaces in a manner to provide a reluctance path equivalent to that of the ferrite, whereby a back gap is virtually eliminated, comprising the steps of:

(a) polishing said circuit parts at their front surfaces and back surfaces,
(b) etching said polished front surfaces to a depth of one half the thickness of said front gap,
(c) coating said etched front surfaces with a film of glass,
(d) coating said back surfaces with a film of glass,
(e) coating a thin film of alumina on said film of glass on said front surfaces,
(f) coating a second layer of glass on said alumina,
(g) placing said above treated ferrite circuit parts in a vacuum at a raised temperature with said coated surfaces facing and in contact with each other,
(h) exerting pressure to said circuit parts in said vacuum for a time to afford bonding thereof by a molecular transport of ferrite molecules such that said reluctance path is achieved, (i) cooling the bonded assembly, and (j) polishing to a desired finish.

4. The method according to claim 3 in which (a) said coating of said front and back surfaces is by radio frequency sputtering of glass thereon to a thickness between 300 and 1200 angstrom units.

5. The method according to claim 3 in which (a) said ferrite circuit parts are placed in a vacuum of at least $10^{-3}$ torr at a temperature of at least 900° centigrade, and (b) exerting pressure to said circuit parts of at least 2000 pounds per square inch for at least 10 minutes.

6. The method of manufacturing a magnetic transducer comprising at least two circuit parts of single crystal ferrite and at least one part of poly-crystalline ferrite, said transducer having a front gap filled with a non-magnetic material and a low reluctance path between said poly-crystalline ferrite parts and said single crystal ferrite parts, comprising the steps of:

(a) polishing one surface on each single crystal ferrite, (b) etching said polished surfaces by radio frequency sputtering to a depth of one half the desired gap length, (c) coating by radio frequency sputtering said etched surfaces with a layer of glass between 300 and 1200 angstrom units, (d) radio frequency sputtering a thin film of alumina on one of said coated surfaces, (e) radio frequency sputtering another layer of glass on the alumina, (f) placing said above treated circuit parts in a vacuum at a raised temperature with said coated surfaces facing each other, (g) applying pressure to said circuit parts for a time sufficient to bond them by molecular transport of ferrite molecules, (h) coating one surface of said poly-crystalline ferrite with a thin layer of glass, (i) placing said coated poly-crystalline ferrite in a vacuum at a raised temperature with the coated surface contacting uncoated aligned surfaces of said bonded crystalline circuit parts, (j) exerting pressure for a time necessary to unite said circuit parts to said poly-crystalline ferrite to form an integral assembly having an approximately uniform reluctance excepting said non-magnetic gap.

References Cited

UNITED STATES PATENTS

| | | | |
|---|---|---|---|
| 3,094,772 | 6/1963 | Duinker | 29—603 |
| 3,098,126 | 7/1963 | Kaspaul | 179—100.2 |
| 3,239,322 | 3/1966 | Carter | 65—43 X |
| 3,325,266 | 6/1967 | Stong | 65—43 X |

JOHN F. CAMPBELL, Primary Examiner

C. E. HALL, Assistant Examiner

U.S. Cl. X.R.

65—43, 59; 179—100.2